FLEXIBLE WING VEHICLE CONFIGURATIONS

Original Filed April 29, 1963 7 Sheets-Sheet 1

INVENTOR
FRANCIS M. ROGALLO

BY

Howard J. Osborn
ATTORNEYS

INVENTOR
FRANCIS M. ROGALLO

BY G. W. O'Brien
Howard J. Osborn
ATTORNEYS

FLEXIBLE WING VEHICLE CONFIGURATIONS

Original Filed April 29, 1963 7 Sheets-Sheet 3

INVENTOR
FRANCIS M. ROGALLO

BY

G. W. O'Brien
Howard J. Osborn
ATTORNEYS

FLEXIBLE WING VEHICLE CONFIGURATIONS

Original Filed April 29, 1963 7 Sheets-Sheet 4

INVENTOR
FRANCIS M. ROGALLO

BY

Howard P. Osborn
ATTORNEYS

FLEXIBLE WING VEHICLE CONFIGURATIONS

Original Filed April 29, 1963 7 Sheets-Sheet 5

INVENTOR
FRANCIS M. ROGALLO

BY

Howard J. Osborn
ATTORNEYS

INVENTOR
FRANCIS M. ROGALLO

BY Howard J. Osborn
ATTORNEYS

INVENTOR
FRANCIS M. ROGALLO

BY

Howard J. Osborn
ATTORNEYS

United States Patent Office

Re. 26,380
Reissued Apr. 23, 1968

26,380

FLEXIBLE WING VEHICLE CONFIGURATIONS

Francis M. Rogallo, 17 Milford Road,
Newport News, Va. 23601

Original No. 3,185,412, dated May 25, 1965, Ser. No. 276,664, Apr. 29, 1963. Application for reissue May 15, 1967, Ser. No. 642,250
23 Claims. (Cl. 244—49)

Matter enclosed in heavy brackets [ ] appears in the original patent but forms no part of this reissue specification; matter printed in italics indicates the additions made by reissue.

*ABSTRACT OF THE DISCLOSURE*

*Flexible wing configurations which are associated with booster mechanism. The flexible wing material and is support structure is compacted by various techniques to facilitate launch and is thereafter positioned to form a wing allowing recovery of spent booster structure and payload.*

The invention described herein may be manufactured and used by or for the Government of the United States of America for governmental purposes without the payment of any royalties thereon or therefor.

This invention relates to flexible, wing vehicle configurations, and more particularly to vehicle configurations that are to a degree collapsible to facilitate launch of the vehicle into an extraplanetary spatial vacuum, the vehicle thereafter being separable (or at least portions thereof being deployable to form wing surfaces capable of reentering the vehicle into an atmosphere and landing it on a planetary body.

Many problems are encountered upon the reentry of a space vehicle into an atmosphere. These problems result from the great speed at which the vehicle is traveling which generates tremendous heat. To overcome this difficulty ablative materials have been used to protect the vehicle structure from the heat. Vehicles capable of maintaining a shallow reentry have been proposed, but this requires a large wing area in relation to the vehicle weight. Due to existing booster capability and packaging techniques it is presently impossible to launch a vehicle having rigid wing structure which will meet the above mentioned requirements for reentry of the vehicle. Thus, many arrangements have been proposed wherein the vehicle is provided with small rigid wing surfaces; however, they fail to provide the necessary lift for maintaining a shallow reentry angle.

Also associated with this problem is the recovery of rocket boosters. To date, the booster has been separated from the payload at predetermined positions and allowed to destroy itself upon reentry into the atmosphere. As the booster capability becomes bigger and more expensive some means of retrieving this mechanism for reuse becomes mandatory. The same problems are inherent in recovery of the boosters that plague vehicle reentry. These problems being that of speed, reentry angle, heat, wing surface area and others.

The present invention is believed to provide a solution for many of the above mentioned difficulties. This is accomplished by providing the vehicle with flexible wing structure which can be readily packaged for launch purposes, yet can be deployed to provide the necessary lift surface for reentry at higher altitudes thereby reducing temperatures by radiating the heat generated during reentry and providing a low-speed flight capability to simplify the landing operation. The flexible wing can be utilized in combination with the vehicle structure which may include a payload alone, a payload in combination with booster structure or booster structure alone. Such an arrangement provides the further advantage of choice of landing site since the vehicle is maneuverable and if powered approaches the flexibility of conventional ai craft.

It is, therefore, an object of this invention to provide a vehicle having flexible wing structure which is collapsible to facilitate vehicle launch.

Still another object of this invention is to provide a vehicle having flexible wing structure capable of maintaining a shallow reentry angle into an atmosphere.

Yet another object of this invention is to provide a vehicle having a flexible wing configuration which is capable of recovering a spent rocket booster or boosters.

Another object of this invention is to provide a flexible wing vehicle wherein the body of the vehicle is separable to provide components of the flexible wing structure.

Another object of this invention is to provide techniques for positioning the flexible wing material prior to reentry of the vehicle into an atmosphere.

An object of this invention is to provide a flexible wing vehicle having structure for transferring loads from one section of the vehicle to another to gain maximum utilization of the flexible wing configuration.

A further object of this invention is to provide means for controlling the flight path of the flexible wing vehicle upon reentry into an atmosphere.

These and other objects and advantages of the invention will become more apparent upon reading the specification in conjunction with the accompanying drawings.

Figure 1:
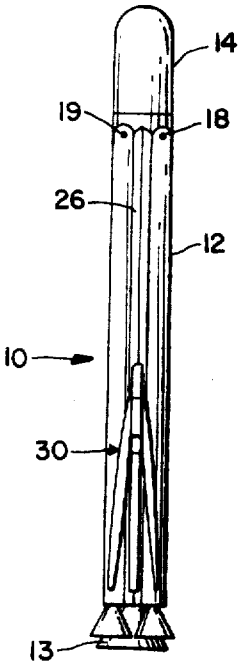
FIG. 1 is a side elevational view showing a flexible wing vehicle collapsed and in a position fol launch.

Basically, this invention relates to a technique for launching a vehicle into an extraplanetary spatial vacuum and thereafter forming a flexible wing configuration for returning the vehicle into an atmosphere and landing it on a planetary surface. This concept has application to many configurations and combinations; however, for a brief description of the invention the vehicle will be considered to consist of a payload and three boosters. The one booster is formed integral with the payload and together this structure forms the central body member of the vehicle. The other two boosters are pivotally connected to the central body member and are adapted to lie adjacent the first mentioned booster member to provide a compact launch configuration. Flexible wing material is connected to the side boosters and the center booster or central body member. The flexible wing material is flexible to the degree that it can be folded like a parachute and is, therefore, easily packaged between the folded boosters. The vehicle is launched in this configuration and may go into orbit or otherwise perform its contemplated mission. When it is desired to recover the vehicle the side boosters are deployed. Appropriate expansion mechanism is provided between the central booster and the side boosters to force the side boosters to move about the pivotal connection with the central body members. Upon deployment of the side boosters the flexible wing material is spread since it is connected to the boosters. The vehicle is thereby provided with wing structure for gliding or powered reentry into the atmosphere and thereafter a landing on a planetary surface. Appropriate controls are provided to direct the flight path of the vehicle.

Referring now more specifically to the details of the invention FIGS. 1–5 show a form of the convertable flexible wing vehicle invention, designated generally by the reference numeral 10.

The vehicle 10 has a keel or central body member 12 which in this embodiment is a booster having a nozzle 13. Formed integral with the booster or attached thereto in a conventional manner is a payload 14. The payload 14 is located at the upper end of the booster 12 and may be a space vehicle, satellite, space experiment, or numerous other payload items.

Figure 2:
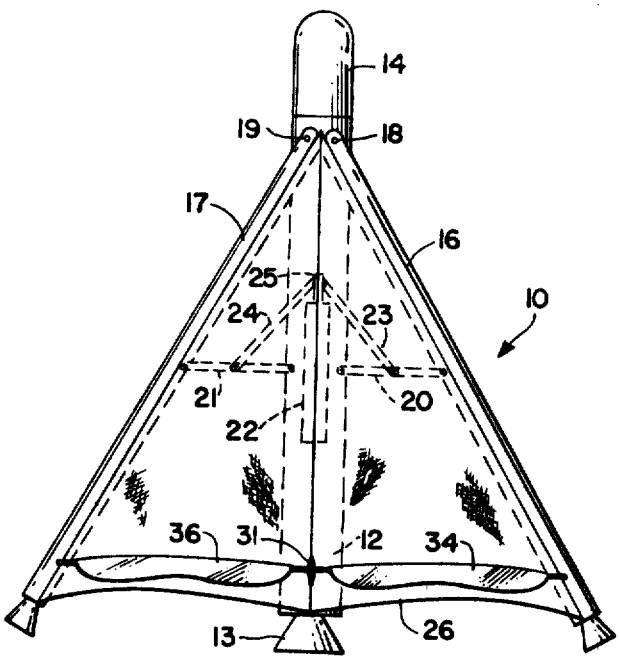
FIG. 2 is a plan view of the flexible wing vehicle as it would appear in a flight position.

Connected to the upper end of the booster 12 or the lower end of the payload 14 are boosters 16 and 17. The boosters 16 and 17 also operate as leading edge wing members in a manner to be explained more fully hereinafter. The boosters are connected to the central body member by conventional pivot connections 18 and 19 (FIG. 2). This pivotal connection can be of a hinge type or the boosters may pivot about a post. The central booster may be recessed to allow proper clustering of the boosters for launch, or the boosters may be positioned adjacent each other in substantially the same plane and the payload configuration enlarged so as to generally form a nose cone for the boosters to improve the aerodynamic configuration of the vehicle upon launch. The side boosters in FIGS. 1–5 are shown as being smaller; however, it is within the scope of the invention to make them the same size or larger than the central booster. The members 16 and 17 can also be fuel cells to supply the large central booster or vice versa.

Structure is provided for causing the boosters 16 and 17 to move about their respective pivot points 18 and 19 or to expand or deploy the flexible wing. This structure is best illustrated in FIG. 2 and includes the expansion link pairs 20 and 21. The pair 20 has their ends pivotally connected together and the one length of the pair is pivotally connected to the booster 16, and the other link has its other end pivotally connected to the booster 12. The pair 21 is constructed similarly but it is connected between the booster 17 and the booster 12. An actuator 22, which may be of the pneumatic or hydraulic type, is carried by the central body member or booster 12, and has an actuator rod 25. The actuator rod 25 is in turn connected to actuator bars 23 and 24 which join the link pairs 20 and 21. The actuator bars are pivotally connected to the link pairs on the same pivot that connects the link pairs together. Energization of the actuator 22 results in the links expanding from a folded position to the position shown in FIG. 2. The link pairs thus force the boosters 16 and 17 to pivot about their pivotal connections to the expanded position. The link pairs 20 and 21 may be designed such that they move over center to fix the boosters 16 and 17 in a particular deployed position, or may be designed to move to a position short of center and thereby utilize the resiliency of the actuator to allow the boosters 16 and 17 some movement. The latter arrangement is often preferable since the vehicle may hit wind gusts, and changing aerodynamic conditions which would make a certain amount of flexibility in the body structure desirable.

Flexible wing material 26 is connected to the booster 12 and to the boosters 16 and 17 in a conventional manner such as by bonding, riveting, stapling, forming a slot in the boosters and anchoring the material under the slot with an enlarged rod or other techniques. The flexible material may be any of a number of materials, certain of the thin plastic materials being particularly adapted for such use. This material is highly flexible and capable of being folded in a manner similar to an ordinary piece of cloth yet very strong and capable of supporting great loads. It should be understood that the term flexible material of flexible wing material used throughout the specification and claims is meant to have the definition that the wing or material take no particular configuration due to its inherent flexibility. In other words, the flexible material under no load conditions would take no particular shape or configuration. It is readily apparent from the FIG. 2 illustration that the flexible wing material 26 will be spread into the general wing configuration shown upon deployment of the boosters 16 and 17 by the actuator 22.

In order to minimize structural design problems as a result of the pivotal connection of the boosters 16 and 17 on the central body member, these boosters being otherwise unsupported, a truss arrangement 30 can be utilized to transfer some of the load from the side boosters to the central booster. It should be understood, however, that such a truss arrangement is not necessary if the weight is properly distributed between the payloads or boosters. The truss arrangement when utilized is best illustrated in FIGS. 2–5 and particularly FIG. 3. It consists of a telescoping vertical strut 31, the strut being of a telescoping nature to facilitate collapsing and having a conventional latch (not shown) to maintain its parts in the proper position when erected. The vertical strut has a pivotal point 32 at its lower end with booster 12. At the upper end the vertical strut carries a double ball arrangement one each of which engages a socket formed in the upper end of the elevon struts 34 and 36. The lower end of elevon strut 34 has a ball and socket connection 35 with the booster 16. The elevon strut 36 has a similar ball and socket connection 37 with the booster 17.

Figure 6:
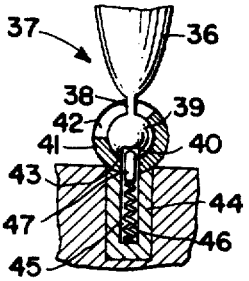
FIG. 6 is a segmental, cross sectional view showing a pivotal connection and locking arrangement for the truss structure.
Figure 4:
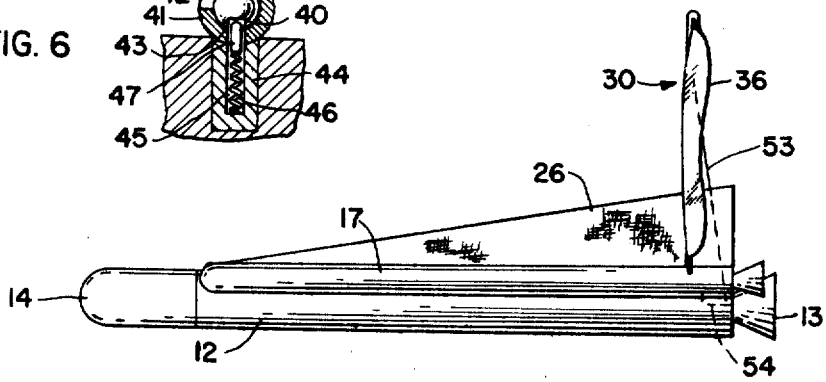
FIG. 4 is a side elevational view of the vehicle shown in FIGS. 1–3.

A cross sectional view of the ball and socket arrangement 37 is shown in FIG. 6. The ball 39 is connected to the elevon strut 36 by the shank 38. The ball 39 has an aperture 40 to receive a latch pin to be described hereinafter. The socket 41 receives the ball 39 which is journaled therein. The socket 1 has an opening 43 which allows the latch pin to pass through the socket and to enter into the ball 39. It also has a slot 42 which allows the shank of the elevon strut to operate therein. The ball and socket is associated with a latch 44 which has a well 45. The latch well 45 contains a spring 46 and latch pin 47. The ball and socket arrangement connecting the truss members together and the truss to the vehicle is necessary to allow collapse of the truss structure for launch purposes. The slot 42 in the ball and socket 37 and the other balls and sockets 32 and 35 similarly designed, allows the truss structure to fold forward. The double ball and socket arrangement 33, of conventional design, not illustrated in detail, at the apex of the truss, allows the elevon struts 34 and 36 to fold against the vertical strut 31. Thus, the truss can be collapsed to facilitate launch of the vehicle. A truss erection cable 53 is connected to the vertical strut 31 and to this structure is a motorized winch 54 (shown diagrammatically in FIG. 3). This structure is utilized a pull the truss into an upright position. The truss is spread upon operation of the actuator 22 to expand the boosters. As shown in FIG. 6 when the truss is moved to the upright position the spring urged latch pin 47 will pass into the opening 40 formed in the ball 39 and maintain the truss arrangement in the upright position. The elevon strut 34 and 36 are under compression during flight operation and transfer the load from the leading edges 16 and 17 forming a part of the flexible wing to the vertical strut 31 and thereby relieve much of the load on the pivotal connections 18 and 19. The truss arrangement also tends to spread the leading edges 16 and 17, and thereby the flexible wing material providing a greater wing span and additional lift.

The truss arrangement 30 also operates as a control means for directing flight of the vehicle. A motivator 50 is carried by the vertical strut 31 and has arms 51 and 52 (FIG. 5) which are connected to the elevon struts 34 and 36 respectively. Since the elevon struts 34 and 36 are airfoil shaped, symmetrical movement of the elevons will cause a pitching movement of the vehicle, and differential movement turning of the vehicle. The arms 51 and 52 may be in the form of cables to facilitate collapse of the truss structure for launch purposes.

Figure 7:
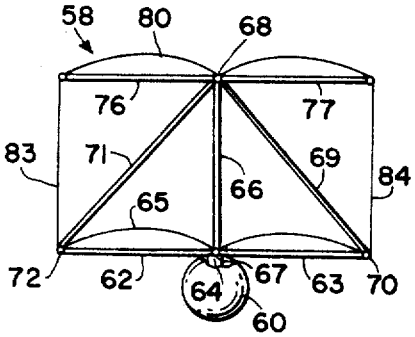
FIG. 7 is an end view of a modified form of the invention showing the utilization of the combination truss and control structure with a bi-flexible wing arrangement.
Figure 8:
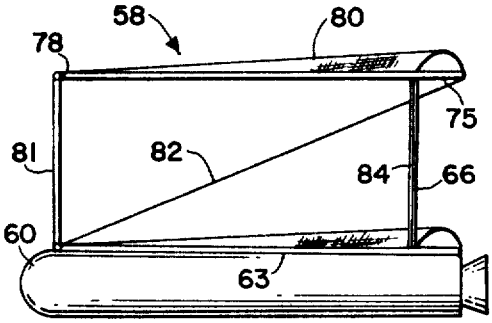
FIG. 8 is a side elevational view of the flexible wing vehicle shown in FIG. 7.

An alternate embodiment of the invention is shown in FIGS. 7 and 8 which incorporates many of the principles shown in the vehicle of FIGS. 1–5. This flexible wing vehicle is designated generally by the reference numeral 58.

The vehicle 58 includes a body member 60 which may consist of a booster, payload combination, or a booster alone. This vehicle differs from the vehicle 10 in that only a central body member 60 is shown; however, it is to be understood that within the broadest aspect of the invention additional booster elements could be associated therewith. The lower leading edge wing numbers 62 and 63, therefore, serve only this purpose where in the previous embodiment the side boosters operated both as booster and leading edge wing members. The members 62 and 63 are hinged to the booster 60 by a conventional hinge arrangement shown diagrammatically, and designated by the reference numeral 64. A flexible membrane or wing surface 65 is connected to the central body member 60 and to the lower leading edge wing members 63 and 63.

A truss arrangement including a vertical strut 66 and compression struts 69 and 71 have pivotal connections 67, 68, 70 and 72 respectively with the body 60 and leading edge wing members. The pivot arrangement may be similar to that shown in FIG. 6. The struts are connected together at their apex with double ball and socket arrangement similar to that in the FIGS. 1–5 embodiment. The compression struts 69 and 71 may also operate as elevons; however, are shown merely as compression struts in the drawings.

This vehicle is a bi-wing vehicle, the upper wing having a keel 75. Upper wing leading edge members 76 and 77 are hinged at 78 to the keel in a conventional manner. Flexible material or membrane 80 is connected to the upper leading edge members 76 and 77 and to the keel 75.

The upper flexible wing is mounted over the lower flexible wing and has the keel 75 thereof fixed to the top of vertical strut 66. In addition the upper and lower flexible wings are connected together by a nose wire or strut 81, diagonal wire 82 and tension wires 83 and 84. The nose wire is connected between the hinge points of the upper and lower wings. The diagonal wire is connected between the nose of the lower flexible wing and the rearmost portion of the upper wing keel. The tension wires are fixed between the rearmost portions of the upper and lower leading edge wing members. These wires are all clearly shown in FIGS. 7 and 8. Thus truss arrangement functions in a manner similar to that described in vehicle 10. In addition, the compression struts function to transfer the load from the upper flexible wing leading edge members to the central body member 60 via the tension wires 83 and 84. The nose wire 81 operates to maintain the same attitude between the upper and lower flexible wings as does the diagonal wire 82. It should also be mentioned that the diagonal wire 82 and the tension wires 83 and 84 can be utilized to control flight direction of the vehicle. This is accomplished by providing each wire with a mechanized takeup and playout device. By taking up and letting out the diagonal wire 82 the position of the top wing can be shifted controlling the pitch of the vehicle. By differentially taking in and letting out the tension wires 83 and 84 the upper flexible wing could be warped so as to turn the vehicle in the direction desired.

The bi-flexible wing vehicle 58 may be particularly adapted to recovering large single boosters or payloads. The additional wing, of course, provides additional lift making it possible to recover vehicles of great weight. The truss and tension wire arrangement also provides means whereby the maximum lift capability is obtained from each wing utilizing simple structure which is readily collapsible and packageable to facilitate launch procedures. Although a bi-wing arrangement is shown, it is to be understood that it is within the scope of the invention to make a tri-wing arrangement or additional wings as the situation might demand.

Figure 9:
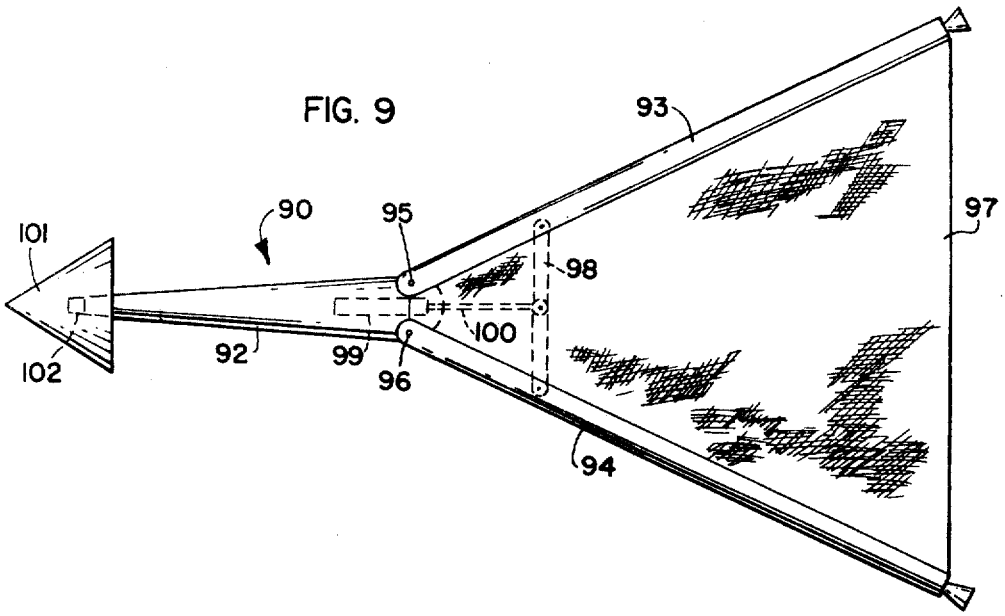
FIG. 9 is a plan view of a modified form of the invention showing a pair of boosters pivotally connected to a payload.
Figure 10:
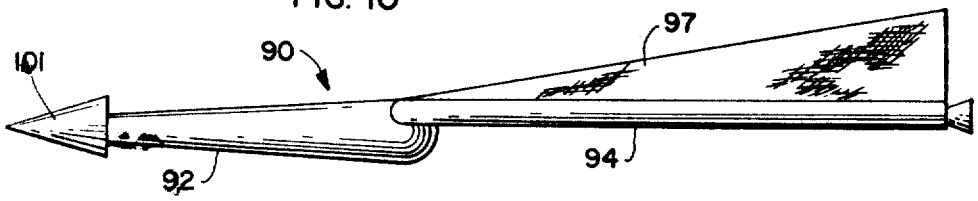
FIG. 10 is a side elevational view of the vehicle shown in FIG. 9.
Figure 3:
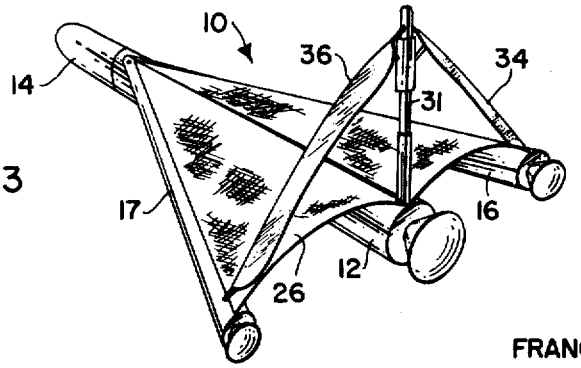
FIG. 3 is a perspective view of the vehicle shown in FIG. 2, showing in greater detail a truss arrangement for transferring vehicle loads from one section to another, the truss arrangement also operating as a control system for controlling the flight path of the vehicle.
Figure 5:
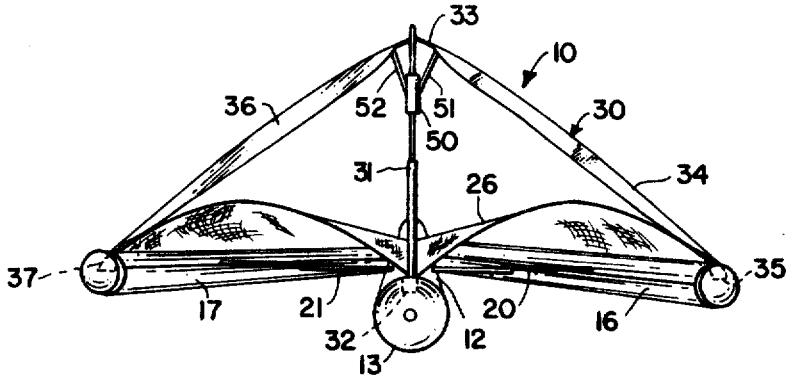
FIG. 5 is an end view of the flexible wing vehicle shown in FIGS. 1–4, and further illustrating control mechanism for determining the flight path of the vehicle.

FIGS. 9 and 10 show still another embodiment of the invention, the flexible wing vehicle being designated generally by the reference numeral 90.

The vehicle 90 includes a payload or similar item 92 to which are pivotally connected leading edge boosters 93 and 94. These boosters have a pivotal connection at 95 and 96 (represented diagrammatically) the connection being similar to those in previous embodiments. A flexible wing membrane 97 is connected between the boosters 93 and 94. The membrane is fixed to the boosters in a conventional manner.

An actuator 99 is carried by the payload 92 and has an actuator rod 100 which is in turn pivotally connected to spreader links 98. Spreader links 98 are joined at their ends by the actuator rod connection, and otherwise pivotally connected to the boosters 93 and 94 as illustrated in FIG. 9. The boosters 93 and 94 are designed so as to fold together and assume a position of adjacency for launch purposes. The spreader links 98 are collapsed in this position. Upon energization of the actuator 99 the links are forced to open thereby deploying the boosters 93 and 94 and spreading the flexible wing material 97.

The flexible wing vehicle is controlled by a canard 101 attached to the nose of the payload. The canard 101 is joined to a mechanized gimbal having at least two degrees' freedom of motion. The canard can be moved in one plane to give pitching action and simultaneously in two planes to give directional control.

The flexible wing vehicle 90 differs from the previous embodiments in that the flexible wing material forms a single lobe wherein as in the previous embodiments the double lobe wing configuration was utilized. It has been found from test models that either configuration will provide adequate wing surface and lift for flight purposes and the control systems described are applicable to both. As in the previous embodiment, the spreader mechanism may be designed so that the links pass over center and lock the boosters in the deployed position. On the other hand, the links may be moved to a position short of center whereby the boosters are allowed to pivot to a degree, utilizing the fluid of the actuator as a cushion for changing aerodynamic conditions.

Figure 11:
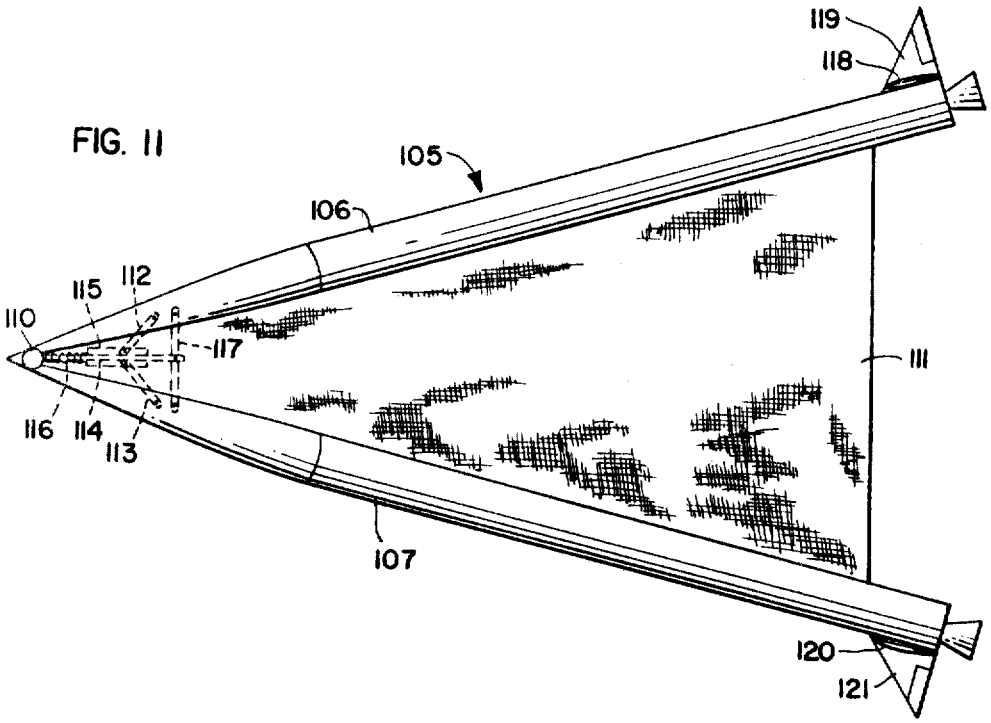
FIG. 11 is a plan view of a flexible wing vehicle showing a pair of boosters pivotally joined at their apex.
Figure 12:
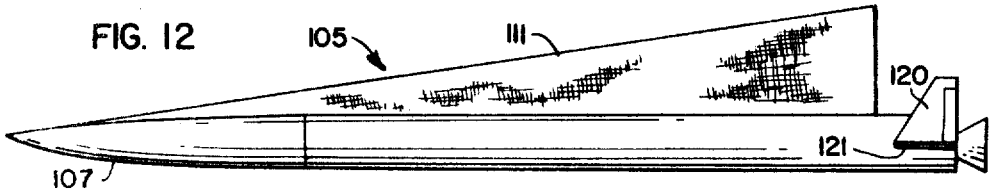
FIG. 12 is a side elevational view of the vehicle shown in FIG. 11.

A form of the invention is shown in FIGS. 11 and 12 wherein the vehicle body elements are hinged directly together at their apex. This flexible wing vehicle is designated generally by the reference numeral 105.

The vehcle 105 has a body which is formed from payloads or payload-booster combination members 106 and 107. The boosters 106 and 107 are pivotally connected at their apex by a hinge 110. The hinge 110 may be a post like element about which the booster structure is interlaced to pivot.

Flexible wing material 111 is fixed to the boosters 106 and 107 in a conventional manner. As in certain of the previously discussed embodiments, the boosters form the leading edge members of the flexible wing. The boosters may be moved to a position of adjacency for launch purposes and thereafter deployed to form the flexible wing configuration by expansion mechanism.

The expansion mechanism includes expansion links 112 and 113. The link 112 is pivotally connected to the booster 106 and to a sleeve 115 which is journaled on a guide post 114. The link 113 is pivotally connected to the booster 107 and to the sleeve 115. The guide post 114 is anchored at one end to the hinge structure 110 and at the other end to a guide post support 117. The guide post support 117 may be made of a telescoping design to facilitate folding the boosters 106 and 107. A compression spring 116 surrounds the guide post 114 and is located between the hinge structure 110 and the end of sleeve 115 which faces the hinge. The spring 116 constantly urges the sleeve in a manner so that the expansion legs 112 and 113 force the boosters 105 and 107 apart. During launch operation the boosters 105 and 107 are held in the collapsed position by conventional structure such as a Marman band. When it is desirable to deploy the vehicle the band is released allowing the spring 116 to expand the boosters.

The vehicle 105 has conventional type horizontal and vertical control surfaces including rudders and elevators. The vertical surface 118 being carried by the horizontal 119 which is attached to the tail portion of booster 106. The vertical surface 120 and horizontal surface 121 are arranged in a similar manner and secured to the booster 107. Conventional control cables and mechanism are associated with the rudders and elevators but are not shown in detail.

Figure 14:
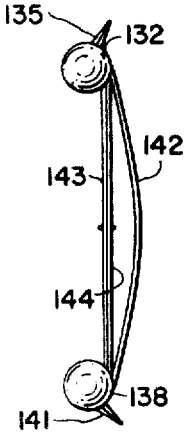
FIG. 14 is an end view of the vehicle shown in FIG. 13.
Figure 13:
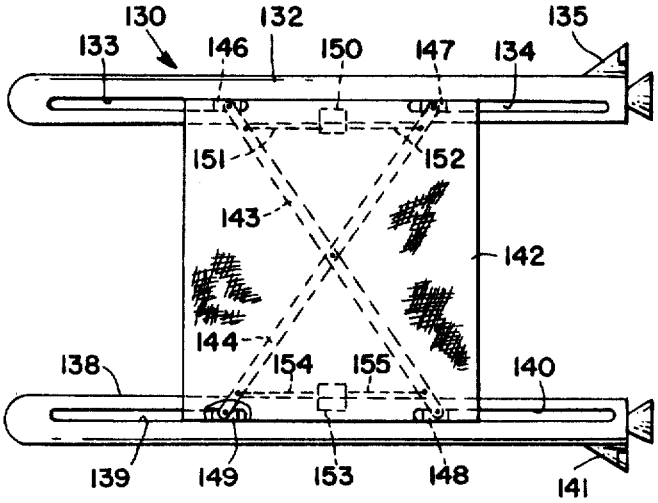
FIG. 13 is a plan view of still another form of the invention showing a vehicle having a pair of boosters which separate to form a flexible wing configuration.

Still another form of the invention is shown in FIGS. 13 and 14, and the vehicle designated generally by the reference numeral 130. In this arrangement the body of the vehicle in effect splits forming a flexible wing vehicle configuration.

The vehicle 130 includes a body which consists of members 132 and 138. These members may be boosters, booster-payload combinations; however, for purposes of illustration the body is considered to consist of a pair of boosters. The booster 132 has a forward guide channel 133 and aft guide channel 134. The booster 138 a forward guide channel 139 and aft guide channel 140. These guide channels are utilized to direct the path of travel of extension mechanism components, to be explained more fully subsequently.

Also attached to the booster body 132 is a control surface 135, and to the booster 138 a control surface 141. The control surfaces 135 and 141 are canted or skewed as shown in FIG. 14, and thereby function as both horizontal and vertical control surfaces. Conventional control mechanism is associated with the movable portions of the control surfaces to provide operation thereof.

Flexible wing material 142 is fixed to the booster 132 and to the booster 138. The flexible material may be rigidly fixed to each of the boosters, or means may be provided in a manner whereby the material is drawn off from a roller as expansion mechanism is in operation.

The expansion mechanism includes expansion straps 143 and 144 which are overlapped and pivotally-connected together at their geometric centers to form a scissors-like arrangement. The ends of expansion strap 143 are pivotally connected to a slide 146 operable in the guide channel 133, and the other end of the expansion strap pivotally connected to a slide 148 operable in the guide channel 140. The expansion strip 144 has one of its ends pivotally connected to a slide 147 operable in the guide channel 134 and its other end pivotally connected to a slide 149 operable in the guide channel 139. As shown in FIG. 13 a mechanized winch 150 (shown diagrammatically) is designed to take in and play out cables 151 and 152 connected to the expansion strips 143 and 144, respectively. A mechanized winch 153 and cables 154 and 155 are similarly connected to the expansion straps associated with the booster 138. As shown in FIG. 13, taking up the cables by use of the winch mechanism will draw the ends of the expansion straps together causing the boosters 132 and 138 to separate. As the boosters separate the flexible wing material 142 is unfolded or unrolled to form a flexible wing vehicle capable of flight. As in the previous embodiments, the boosters are moved to a position of adjacency to facilitate launching the vehicle.

Figure 15:
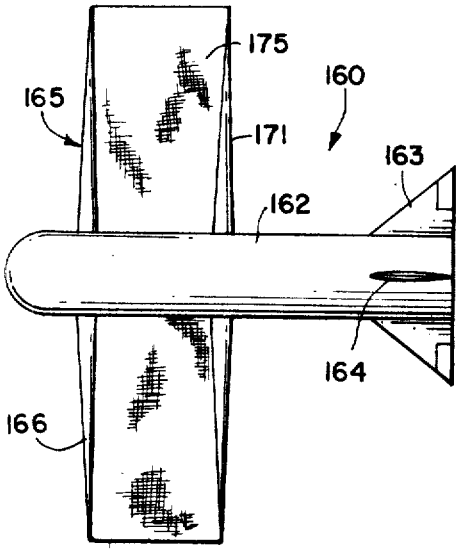
FIG. 15 is a plan view of still another modification of the flexible wing vehicle showing an arrangement whereby the flexible wing structure is deployed from the vehicle.
Figure 16:
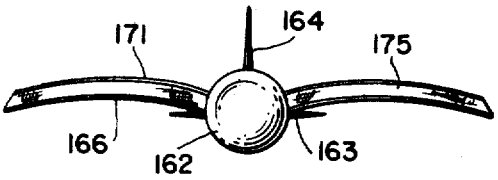
FIG. 16 is an end view of the vehicle shown in FIG. 15.

A further embodiment of the invention is illustrated in FIGS. 15 and 16, this vehicle being designated generally by the reference numeral 160. The vehicle 160, like the vehicle 58, is designed primarily for use with recovery of a single booster or payload configuration.

The vehicle 160 has a body 162 which for purpose of illustration may be considered a booster. It has horizontal and vertical control surfaces 163 and 164 having elevators and rudders respectively, operable by conventional mechanism for controlling the flight path of the vehicle.

The flexible wing structure 165 is of a flexible nature, and is designed to be collapsible to facilitate launch purposes. The wing 165 includes a leading edge member 166 having a T-shaped slot 167 (FIGS. 19 and 20) in its trailing edge for purposes which will be explained presently. A wire conduit 168 and cover plate 169 (FIG. 20) also form a part of the leading edge member 166.

The wing 165 also has a trailing edge member 171 spaced from the leading edge member and staggered with respect therto to facilitate the folding of the members. A T-shaped slot 172 is formed in the leading edge of the trailing edge member and faces the T-shaped slot 167.

Figure 20:
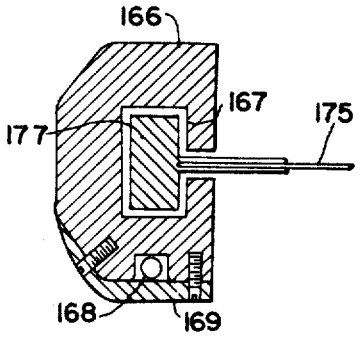
FIG. 20 is a cross sectional view taken along the section lines XX—XX of FIG. 19.
Figure 21:
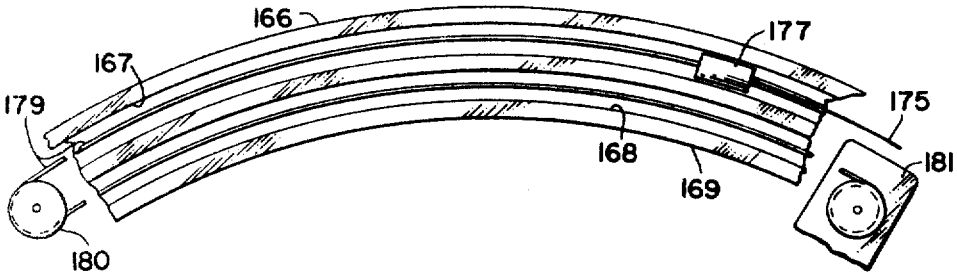
FIG. 21 is a segmental view, partially cut away to show mechanism for moving the flexible wing material.
Figure 19:
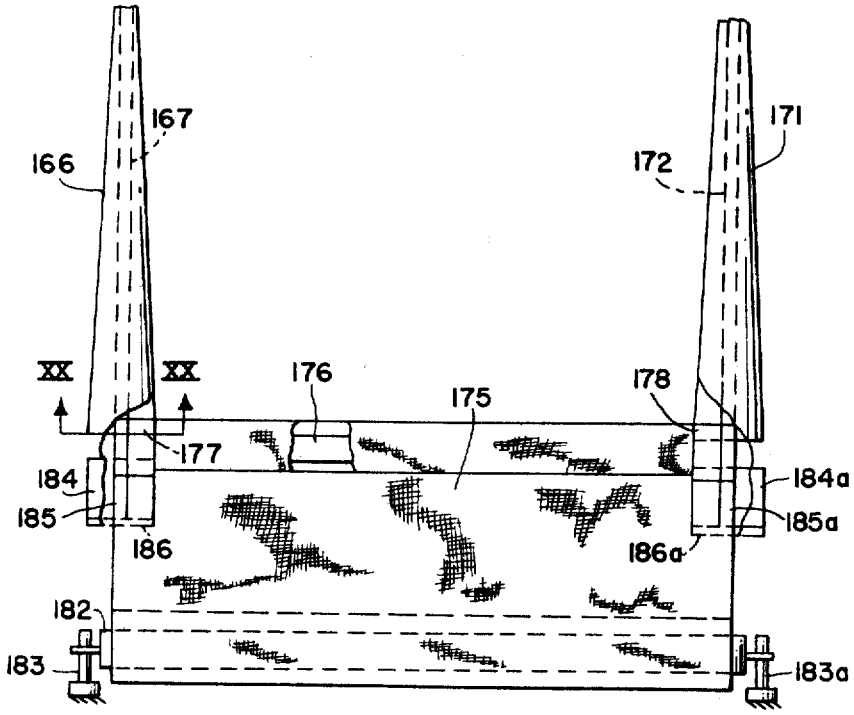
FIG. 19 is a segmental view, partially cut away, showing a technique for extending flexible wing material.

Flexible wing material 175 is positioned between the wing leading and trailing edge members by mechanism shown in FIGS. 19 through 21. Flexible wing material 175 is wound on a spring loaded roller 182 which is supported in brackets 183 and 183a. The end of the flexible material 175 is folded over to form a hem which houses a slat 176 (FIG. 19). Attached to the slat 176 are carriers 177 and 178. The carrier 177 has a T-shaped cross section as shown in FIG. 20, the head of the carrier operating in T-shaped slot 167 and the tail of the carrier being split and designed to clamp the flexible material therebetween. The carrier 178 is similarly designated and is operative in the T-shaped slot 172 of the trailing edge member. The slat 176 attached to or formed integral with the carriers 177 and 178 form a stiffened edge on the flexible material 175 which allows the material to be pulled off the roller 182 to the tips of the leading and trailing edge members.

The mechanism for doing this is best shown in FIG. 21, and includes a wire 179 which is fixed to the carrier 177. The wire 179 passes through the T-shaped slot 167 around a pulley 180 and back through the wire conduit 168 to a mechanized takeup drum 181. Rotation of the takeup mechanism in the clockwise direction, as shown in FIG. 21, results in the wire 179 being wound onto the drum and the carrier 177 being pulled towards the pulley 180. The pulley 180 is located in the tip of the leading edge member so that when the carrier 177 reaches this position the flexible wing material 175, including the leading and trailing edge members form the wing surface. In certain applications structure must be provided in both the leading and trailing edge members to unroll the flexible material; however, in other applications only one such system is necessary due to the interconnecting slat 176.

Coupling blocks 174 and 184a are provided to allow collapsing of the leading and trailing edge members and to guide the gliders 177 and 178 into the T-shaped slots 167 and 172. The coupling blocks 184 and 184a have T-shaped slots 185 and 185a which are in alinement with the slots formed in the leading and trailing edge members. Stop plates 186 and 186a are associated with the coupling blocks 184 and 184a respectively, to prevent the gliders from being drawn onto the spring loaded roller 182. As shown in FIG. 19, the space between the leading edge member 166 and coupling block 184 and the trailing edge member 172 and the coupling black 184a is such that it is possible to pivot the leading and trailing members to a collapsed position, yet are close enough together so as to make an easy transition from the coupling blocks to the leading and trailing edge members.

Figure 17:
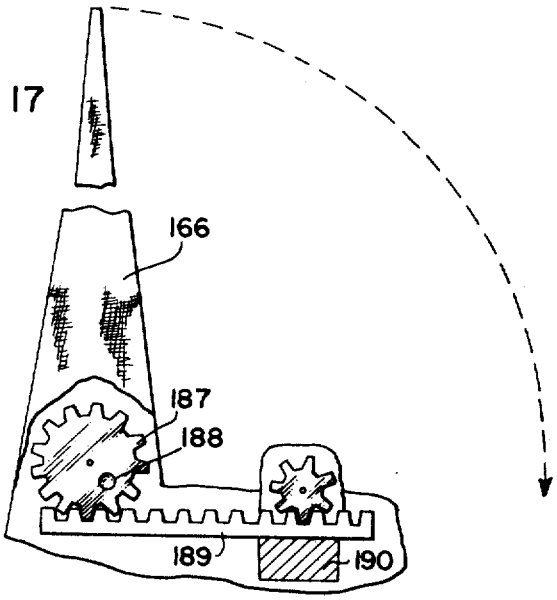
FIG. 17 is a segmental view showing structure for deploying components of the vehicle shown in FIGS. 15 and 16.

Mechanism for moving the leading edge member 166 from a collapsed position to an erected position is best shown in FIG. 17. This is accomplished by a rack and pinion arrangement, the pinion 187 being fixed to the leading edge member 166 and the unit journaled about an axle carried by the body member. The pinion 187 has teeth which mesh with a rack 189 also carried by appropriate structure in the body member. The rack 189 is moved by a motorized operator 190 which includes a gear having teeth meshing with the rack teeth. According to well known mechanical principles, when the rack translates the pinion is rotated and moves the leading edge member to the desired position.

Figure 18:
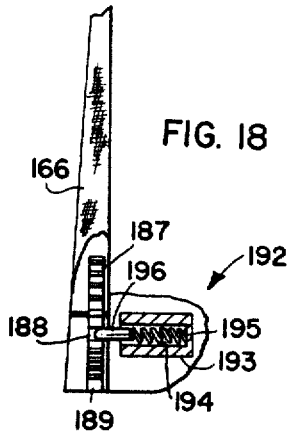
FIG. 18 is a segmental view, partially in cross section, showing mechanism for locking components shown in FIGS. 15–16 in a deployed or erected position.

The leading edge member is maintained in the erected position by a latch arrangement 192. The latch is of simple construction, it having a chamber 194 which houses a compression spring 195. The compression spring 195 bears against a latch bolt 196 which projects through a chamber opening into a pinion aperture 188, as best shown in FIG. 18. Although not shown similar structure is utilized for erecting the trailing edge member 172 and; therefore, will not be explained in detail. Likewise the wing structure for only one side of the vehicle has been explained, but it is to be understood that the details of the opposite wing panel are similar. The mechanism for erecting the leading and trailing edge members may be constructed and arranged so that both members fold toward the tail of the vehicle or one toward the tail and one toward the front of the vehicle.

Figure 22:
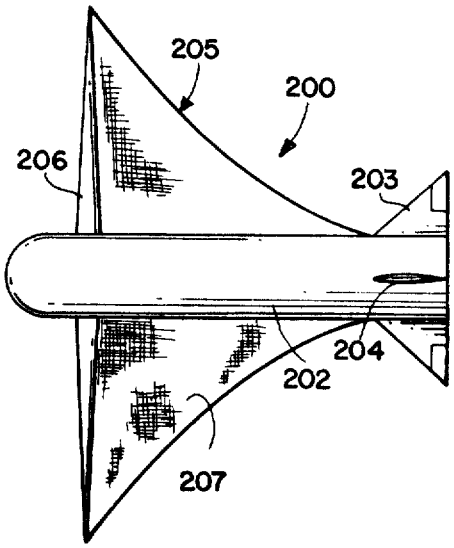
FIG. 22 is a plan view of yet another flexible wing vehicle showing another type of flexible wing deployable from the vehicle body.
Figure 23:
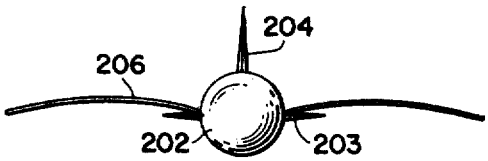
FIG. 23 is an end view of the vehicle shown in FIG. 22.

A form of the invention is shown in FIGS. 22 and 23 which is similar to the vehicle 160, but differs in that only the leading edge wing member is utilized and a different shaped wing panel provided. This vehicle is designated generally by the reference numeral 200.

The vehicle 200 has a body taking the form of a booster for purposes of illustration. The tail section of the body 202 is provided with horizontal and vertical surfaces 203 and 204 having movable control portions similar to that in a conventional aircraft.

The wing 205 includes leading edge members 206 which are similar in design to the leading edge member 166 of vehicle 160. The leading edge member may differ somewhat; however, in that the flexible wing material 207 may be directly connected to the leading edge member, rather than rolled out as in the vehicle 160. It should be understood; however, that within the broadest aspect of the invention the flexible wing material 207 may also be moved to its extended position by mechanism similar to that utilized in vehicle 160. The means for erecting the leading edge member 206 is similar to that shown for erecting the leading edge member 166. Obviously, other techniques within the skill of the art may be utilized to move the leading edge members through an angle of as much as 90°.

Figure 24:
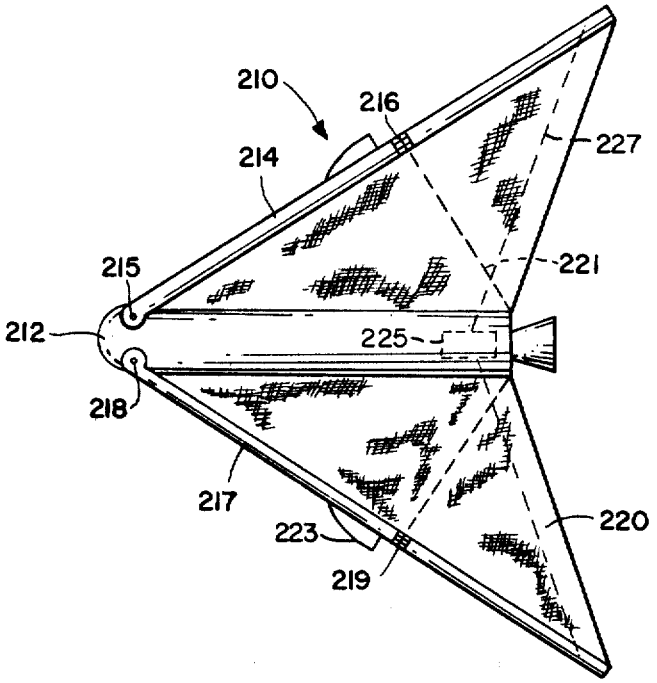
FIG. 24 is a plan view of a further form of the invention.
Figure 25:
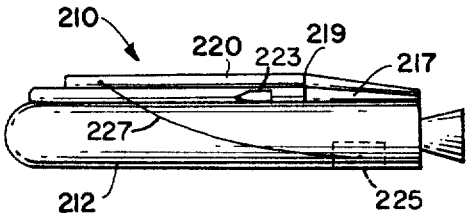
FIG. 25 is a side elevational view of the vehicle shown in FIG. 24, and shown in the folded position.

Yet another form of the invention is shown in FIGS. 24 and 25, designated generally by the reference numeral 210.

The vehicle 210 includes a body 212 which may be in the form of a booster. Leading edge members 214 and 217 have pivotal connections 215 and 218, respectively, on the apex of the body 212. The leading edge member 214 has an intermediate joint 216 and the leading edge 217 an intermediate joint 219. These joints may be of a hinge type or ball and socket arrangement and are designed so that the leading edge members fold on themselves to facilitate a compact packaging arrangement. Flexible wing material 220 is fixed to the body 212 and leading edge members 214 and 217 in a conventional manner. Fold lines 221 and 222 are shown in FIG. 24, and represent the approximate line along which the flexible material would fold to form the compact arrangement shown in FIG. 25.

The leading edge members 214 and 217 can be made approximately twice the length of the body member 212 and jointed at the center. The leading edge members when in the folded position would be of approximately the same length as the booster to facilitate launch of the vehicle. It should be understood however, that within the broadest aspect of the invention the leading edge members may be divided into shorter components. Also, the leading edge members may take the form of fuel cells, boosters and other structure as indicated in the previous vehicle arrangements. *Assuming that at least a portion of the leading edge members are boosters, they could be provided with nozzles or discharge openings 223.* As shown in FIG. 24, the vehicle 210 is capable of having wings of a high aspect ratio which may provide desirable aerodynamic advantages under certain flight conditions and circumstances. The leading edge members 214 and 217 are shown as folding in a manner so that the flexible material is folded on top of itself or below itself. It is to be understood, that it is within the purview of the invention to fold the leading edge members in a manner such that they are side by side rather than above or below each other.

Structure such as a cable and a motorized winch may be attached to the portion of the wings which must be unfolded; however, these portions of the wings upon engaging the airstream may be unfolded by the airstream. It is also contemplated that the vehicle may be controlled by moving the section of the wings rearward of the joints 216 and 219 by conventional control mechanism. If this type of control is not utilized, some type of latch, similar to that shown in FIG. 6, may be combined with joints 216 and 219 to lock the leading edge members in their unfolded position. *A control mechanism which might be utilized includes a winding drum 225 and cables 227 attached thereto and to the portion of the leading edge members being the joints 216 and 219. Symmetrical takeup of the cables would provide pitch control and asymmetrical movement roll control.*

From the above description, the operation of the various vehicles are believed clear. In each configuration of vehicle, the appendages of the vehicle body are folded or collapsed into a position of adjacency. This is true whether or not the particular configuration involves several boosters or one booster having a collapsible wing structure. It should also be understood, that it is within the scope of the invention to provide an additional housing for any of the configurations to provide more efficient aerodynamic shapes for launch purposes. Thereafter, when it is desired to reenter the vehicle or otherwise utilize the vehicle in its flight configuration, the casing may be jettisoned by conventional mechanism, such as explosive bolts, exposing the vehicles substantially as shown and described. It is further apparent, that in certain instances and with certain vehicle configurations it may be desirable to house or streamline only certain portions of the vehicle and jettison these portions when the flight configuration is necessary.

From the above description it is readily apparent that the invention provides means whereby large payloads and/or boosters can be recovered providing a great savings in material and money now being lost. The flexible wing vehicle is capable of maintaining a shallow reentry angle requiring minimum use of ablative material. The flexible wing vehicle s designed such that it may glide to a desired landing position or be powered to a predetermined landing site. Obviously, the invention has application to many situations which include recovery of boosters from multistage missiles after burnout and separation, return of supply or fuel tanks which have been attached to a space station after the supplies or fuel have been consumed. The flexible wing vehicle could also be used to return space ships after rendezvous operations with space station. It should also be understood, that the invention is not limited to space operations or applications, the configurations could be moatorized for lower altitude operations for moving supplies, space components, boosters, payloads and other articles to different positions on earth. Such flexible wing aircraft could also be used as a glider for the same purpose and towed by other aircraft. The various shapes of the wings can be modified to conform to the particular situation required, and also the aspect ratios of the wings varied to provide higher efficiency under certain circumstances. It is also suggested that the flexible wing vehicle may have particular merit as a reentry craft to eliminate the existing problem of communication blackout. The termination of communication during reentry is attributable to the high reentry temperatures, angle of reentry and heat all of which are greatly minimized with the inventioin vehicle.

It is to be understood that the foregoing disclosure relates only to preferred embodiments of the invention, and that numerous modifications and variations of the present invention are possible in the light of the above teachings, without departing from the spirit and the scope of the invention, as set forth in the appended claims.

I claim:

1. A vehicle capable of being launched from a planetary surface into an extraplanetary spatial vacuum and to reenter an atmosphere comprising:

vehicle body means;

booster means forming a part of said body means for placing said vehicle into an extraplanetary spatial vacuum;

means forming said booster means being separable to form wing support structure; and flexible material means connected between said last mentioned means to provide a wing surface for returning said vehicle into an atmosphere and landing on a planetary surface.

2. A vehicle capable of being launched from a planetary surface into an extraplanetary spatial vacuum and to reenter an atmosphere as in claim 1 wherein said booster means includes a cluster of boosters at least certain of said boosters being separable to form wing support structure.

3. A vehicle capable of being launched from a planetary surface into an extraplanetary spatial vacuum and to reenter an atmosphere as in claim 2 wherein said boosters are hinged together at their apex.

4. A vehicle capable of being launched from a planetary surface into an extraplanetary spatial vacuum and to reenter an atmosphere as in claim 2 wherein said vehicle body includes a payload; said booster cluster including two boosters hinged at their apex to the payload.

5. A vehicle capable of being launched from a planetary surface into an extraplanetary spatial vacuum and to reenter an atmosphere as in claim 2 wherein said booster cluster includes a pair of boosters; said boosters being hinged at their apex.

6. A vehicle capable of being launched from a planetary surface into an extraplanetary spatial vacuum and to reenter an atmosphere as in claim 2 wherein said booster cluster includes a pair of boosters; said boosters splitting into a generally parallel relationship and a wing surface formed therebetween.

7. A vehicle capable of being launched from a planetary surface into an extraplanetary spatial vacuum and to reenter an atmosphere comprising:

vehicle body means;

said vehicle body means including a plurality of boosters;

one of said boosters forming a central body member;

a payload forming an extension of said central body member;

other of said boosters pivotally joined to said payload on either side of said central body member;

flexible material connected between said central body member and said other boosters;

said boosters being so constructed and arranged so as to allow clustering for launch into an extraplanetary spatial vacuum; and expansion means connected between said central body member and said other boosters to move said other boosters away from said central body member;

said other booster members upon deployment operating as the leading edges of a wing and said flexible material together forming a wing for reentry into an atmosphere and landing on a planetary surface.

8. A vehicle capable of being launched from a planetary surface into an extraplanetary spatial vacuum and to reenter an atmosphere as in claim 7 wherein said expansion means includes pairs of links pivotally joined at their ends between said central body member and each of said other boosters;

said link pairs each being connected together by a pivotal connection;

actuator means carried by said central body member; and actuator bars tied between said actuator and said link pairs pivotal connection whereby upon energization of said actuator said pairs of links deploy said other boosters.

9. A vehicle capable of being launched from a planetary surface into an extraplanetary spatial vacuum and to reenter an atmosphere as in claim 7 wherein truss means is connected between said central body member and said leading edge members to transfer load from said leading edges to said central body member.

10. A vehicle capable of being launched from a planetary surface into an extraplanetary spatial vacuum and to reenter an atmosphere as in claim 9 wherein said truss means includes an upright member projecting from said central body member; and angular members connected to said upright member and to said leading-edge bodies;

said angular members having a universal type connection with said upright member and said truss means having a universal type connection with said vehicle body means whereby said truss means may be folded.

11. A vehicle capable of being launched from a planetary surface into an extraplanetary spatial vacuum and to reenter an atmosphere as in claim 10 wherein said truss means universal type connection with said body includes latch means for maintaining said truss means in an erected position upon deployment of said leading edge bodies.

12. A vehicle capable of being launched from a planetary surface into an extraplanetary spatial vacuum and to reenter an atmosphere as in claim 10 wherein said nagular members are elevons; and means connected to said elevons for movement thereof to control the flight of said vehicle.

13. A vehicle capable of being launched from a planetary surface into an extraplanetary spatial vacuum and to reenter an atmosphere as in claim 10 wherein means is connected between said truss means and said central body means for erecting said truss means.

14. A vehicle capable of being launched from a planetary surface into an extraplanetary spatial vacuum and to reenter an atmosphere comprising:

vehicle body means;

said vehicle body means including a pair of boosters;

a payload;

said boosters being pivotally connected to said payload;

flexible material connected between said boosters;

said boosters being positionable adjacent one another and in alignment with said payload to facilitate placing said vehicle in an extraplanetary spatial vacuum; and expansion means between said boosters to move said boosters to an angular position with respect to said payload, said boosters forming the leading edges of a wing and said flexible material together forming a wing surface.

15. A vehicle capable of being launched from a planetary surface into an extraplanetary spatial vacuum and to reenter an atmosphere as in claim 14 wherein said expansion means includes a pair of spreader links pivotally connected at either end to said boosters;

said spreader links being joined by a central pivotal connection;

actuator means carried by said payload; and an actuator rod joining said actuator means and said central pivotal connection whereby upon energization of said actuator said links deploy said boosters.

16. A vehicle capable of being launched from a planetary surface into an extraplanetary spatial vacuum and to reenter an atmosphere as in claim 14 wherein said payload has a canard type control surface;

motivation means having at least two degrees freedom of motion for operating said control surface.

17. A vehicle capable of being launched from a planetary surface into an extraplanetary spatial vacuum and to reenter an atmosphere comprising:

vehicle body means, said vehicle body means including a pair of boosters;

said boosters being pivotally joined at their apex;

flexible material connected between said boosters;

said boosters being positionable adjacent one another to facilitate placing said vehicle in an extraplanetary spatial vacuum; and expansion means between said boosters to move said boosters about said pivot joint;

said boosters forming the leading edges of a wing and said flexible material together form a wing surface whereby said vehicle is capable of reentry into an atmosphere and landing on a planetary surface.

18. A vehicle capable of being launched from a planetary surface into an extraplanetary spatial vacuum and to reenter an atmosphere as in claim 17 wherein said expansion means includes a pair of expansion links pivotally connected to said boosters;

said link pair being joined by a pivotal connection at their other ends to an actuator sleeve; and resilient means biasing said actuator sleeve to a position whereby said boosters are forced to move to an expanded position; and means for controlling the flight of said vehicle.

19. A vehicle capable of being launched from a planetary surface into an extraplanetary spatial vacuum and to reenter an atmopshere comprising:

vehicle body means;

said vehicle body means including a pair of boosters, said boosters being joined together to facilitate launching said vehicle into an extraplanetary spatial vacuum;

flexible material connected between said boosters; and expansion means for splitting said boosters and maintaining them substantially parallel whereby a wing surface is formed from said flexible material connected between said boosters for returning said vehicle into an atmosphere and landing on a planetary surface.

20. A vehicle capable of being launched from a planetary surface into an extraplanetary spatial vacuum and to reenter an atmosphere as in claim 19 wherein expansion means includes expansion straps pivotally connected to the fore and aft of said boosters and to each other in scissor-like fashion;

take-up means joining the end areas of said straps to change their relative position and thereby expand said boosters; and control means for directing the flight of said vehicle.

21. A vehicle capable of being launched from a planetary surface into an extraplanetary spatial vacuum and to reenter an atmosphere comprising: vehicle body means; booster means forming a part of said body being separable from remaining body means and means to form wing support structure; means associated with said booster means forming a part of said body being foldable on itself to facilitate launch; and flexible material means connected between said booster means forming a part of said body means being separable and the remaining body means to provide a wing surface for returning said vehicle into an atmosphere and landing on a planetary surface.

22. A vehicle capable of being launched from a planetary surface into an extraplanetary spatial vacuum and to reenter an atmosphere as in claim 21 wherein said booster means forming a part of said body means being separable from remaining body means includes wing leading edge members; said wing leading edge members being jointed and foldable to facilitate packaging for launch of said vehicle; said flexible wing material means being foldable with said leading edge members.

*23. A vehicle capable of being launched from a planetary surface into an extraplanetary spatial vacuum and to reenter an atmosphere comprising:*

*vehicle body means;*

*booster means forming a part of said body being separable from remaining body means to form wing support structure;*

*said wing support structure means being jointed and foldable on itself to facilitate launch;*

*flexible material connected between said body means and said wing support structure means to form a wing surface; and*

*control means connected to the jointed portions of the wing support structure movable after unfolding to change the configuration of the wing and control flight direction of the vehicle.*

(References on following page)

References Cited

The following references, cited by the Examiner, are of record in the patented file of this patent or the original patent.

UNITED STATES PATENTS

| | | | |
|---|---|---|---|
| D. 194,647 | 2/1963 | Brown. | |
| 2,193,029 | 3/1940 | Juul | 244—144 |
| 3,065,937 | 11/1962 | Vigil | 244—1 |
| 3,090,580 | 5/1963 | Kehlet et al. | 244—49 X |

OTHER REFERENCES

"Ryan Reporter," March-April 1962 (pages 8–13).

"Aviation Week and Space Technology" (Plattner), Feb. 4, 1963.

MILTON BUCHLER, *Primary Examiner.*

B. BELKIN, *Assistant Examiner.*